United States Patent
Bugenhagen

(10) Patent No.: US 7,715,414 B1
(45) Date of Patent: May 11, 2010

(54) COMMUNICATION SERVICE PROVIDER THAT CONTROLS AN ACCESS INTERFACE OF AN ACCESS PROVIDER WHERE THE ACCESS INTERFACE IS LOCATED AT A CUSTOMER PREMISE

(75) Inventor: Michael K. Bugenhagen, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1158 days.

(21) Appl. No.: 11/195,445

(22) Filed: Aug. 2, 2005

(51) Int. Cl.
H04L 12/56 (2006.01)
(52) U.S. Cl. ..................................... 370/401
(58) Field of Classification Search .................. 370/230, 370/241, 249, 229, 351, 389, 395.1, 395.2, 370/395.21, 231, 400, 401; 455/403, 422.1, 455/423; 709/221; 726/26, 27, 28, 2, 3, 726/4, 5, 6; 379/201.01, 207.02, 207.11; 713/150, 153
See application file for complete search history.

(56) References Cited

U.S. PATENT DOCUMENTS

| | | | | |
|---|---|---|---|---|
| 6,546,095 | B1 * | 4/2003 | Iverson et al. | 379/201.12 |
| 6,934,532 | B2 * | 8/2005 | Coppinger et al. | 455/412.1 |
| 7,039,015 | B1 * | 5/2006 | Vallone et al. | 370/252 |
| 7,188,360 | B2 * | 3/2007 | Gerdes et al. | 726/4 |
| 2003/0061517 | A1 * | 3/2003 | Mereu et al. | 713/201 |
| 2004/0228354 | A1 * | 11/2004 | Anschutz et al. | 370/395.21 |
| 2004/0236686 | A1 * | 11/2004 | Bohmer et al. | 705/40 |
| 2005/0220033 | A1 * | 10/2005 | DelRegno et al. | 370/249 |
| 2006/0153070 | A1 * | 7/2006 | DelRegno et al. | 370/229 |
| 2006/0248598 | A1 * | 11/2006 | Johnson et al. | 726/27 |

* cited by examiner

Primary Examiner—Kwang B Yao
Assistant Examiner—Obaidul Huq

(57) ABSTRACT

A communication service provider transfers an access request to an access provider to support a service for a customer. The communication service provider receives an authentication code and a corresponding authorized action from the access provider and distributes the authentication code to service provider personnel authorized to initiate the corresponding authorized action. In response to an input by the service provider personnel, a control system transfers an action request to an access interface at the customer premise wherein the access interface performs the corresponding authorized action based on the authentication code and the corresponding authorized action.

20 Claims, 6 Drawing Sheets

COMMUNICATION SERVICE PROVIDER THAT CONTROLS AN ACCESS INTERFACE OF AN ACCESS PROVIDER WHERE THE ACCESS INTERFACE IS LOCATED AT A CUSTOMER PREMISE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to establishing and using a secure control interface between a service provider and an access provider interface at a customer premise.

2. Description of the Prior Art

A communication service provider provides communications services to customers. For example, Sprint Corporation provides telephony and Internet services to many businesses. The $3^{rd}$ party communications network between the service provider and the customer are referred to as access or the access provider. Sometimes, the service provider also provides the access for the communication services, and thus, the service provider is also the access provider. For example, Sprint Corporation may provide wireless access between the customer and Sprint's service systems that provide the Internet and telephony services. Other times, the service provider does not provide the access, and instead, a separate access provider provides the access between the customer and the service provider. For example, a cable television company may provide the access between customers and Sprint, where Sprint provides the customer with Internet and telephony services over the access provided by the cable television company. This situation appears to be expanding as a growing number of companies are providing access and a growing number of other companies are providing communication services.

In the past, the access was typically provided over Time Division Multiplex (TDM) connections. In a situation where one company provided TDM access and a separate company provided services to the customer over the TDM access, the service provider was given the ability to perform loopback tests over the TDM connection. For example, the service provider would send a control signal over the TDM connection to the access provider customer interface at the customer premise, and the access provider customer interface would loopback the TDM communication path back to the service provider for testing and troubleshooting purposes.

TDM connections physically separate customer traffic by time slots. Thus, the traffic of one customer is isolated from the traffic of other customers. Given the isolation of a TDM connection, a hacker could not view or modify the traffic in another customer's time slot. Loopbacks cannot be triggered by a hacker. Thus, TDM access connections provide inherent security benefits.

At present, the access is increasingly provided over packet connections, such as Internet Protocol (IP) or Ethernet links. These packet access connections do not have the same inherent security benefits of TDM access connections. In particular, packet systems do not effectively isolate the traffic of various customers. Thus, a hacker that poses as a customer could cause serious problems to other customers if they can access troubleshooting and testing functions, such as loopback functionality. Unfortunately, this security problem prevents the service provider from performing effective testing and control of a packet access connection that is provided by a separate access provider.

SUMMARY OF THE INVENTION

Examples of the invention include a communication service provider wherein a customer requests a communication service from the communication service provider. The communication service provider comprises a control system and a service system. The control system is configured to transfer an access request to an access provider that is separate from the communication service provider and that provides an access interface at a customer premise of the customer and provides a packet service link and a packet control link from the access interface to the communication service provider. The control system is configured to receive an authentication code and a corresponding authorized action from the access provider in response to the access request wherein the authentication code is distributed to service provider personnel authorized to initiate the corresponding authorized action. Note that in response to the access request, multiple authentication codes could be generated that correspond to various combinations of authorized actions, so different control privileges may be given to customer and service provider personnel. The control system is configured, in response to an input by the service provider personnel authorized to initiate the corresponding authorized action, to transfer an action request over the packet control link to the access interface at the customer premise wherein the action request indicates the authentication code and the corresponding authorized action for the packet service link, wherein the access interface performs the corresponding authorized action for the packet service link based on the authentication code and the corresponding authorized action. Note that a set of actions could be performed in response to a single action request. The control system is configured to receive an action result from the access interface indicating a result of the action request. The service system is configured to provide the communication service over the packet service link.

In some examples of the invention, the corresponding authorized action comprises a test.

In some examples of the invention, the corresponding authorized action comprises a loopback test and the communication service provider is configured to transfer a test signal over the packet service link to the access interface in response to the action result and process the test signal looped back by the access interface to determine performance of the packet service link.

In some examples of the invention, the corresponding authorized action comprises an information request and wherein the action result indicates the requested information.

In some examples of the invention, the requested information comprises at least one of: packets received, packets transferred, packets lost, and packet latency for the packet service link.

In some examples of the invention, the corresponding authorized action comprises a provisioning task.

In some examples of the invention, the provisioning task comprises adjusting bandwidth on the packet service link.

In some examples of the invention, the provisioning task comprises turning off the packet service link.

In some examples of the invention, the provisioning task comprises adding an additional packet service link from the access interface to the communication service provider.

In some examples of the invention, the authentication code automatically expires and wherein the control system is configured to receive a new authentication code from the access provider to replace the expired authentication code, wherein the new authentication code is distributed to the service provider personnel authorized to initiate the corresponding authorized action.

BRIEF DESCRIPTION OF THE DRAWINGS

The same reference number represents the same element on all drawings.

DETAILED DESCRIPTION OF THE PREFERRED EMBODIMENT

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
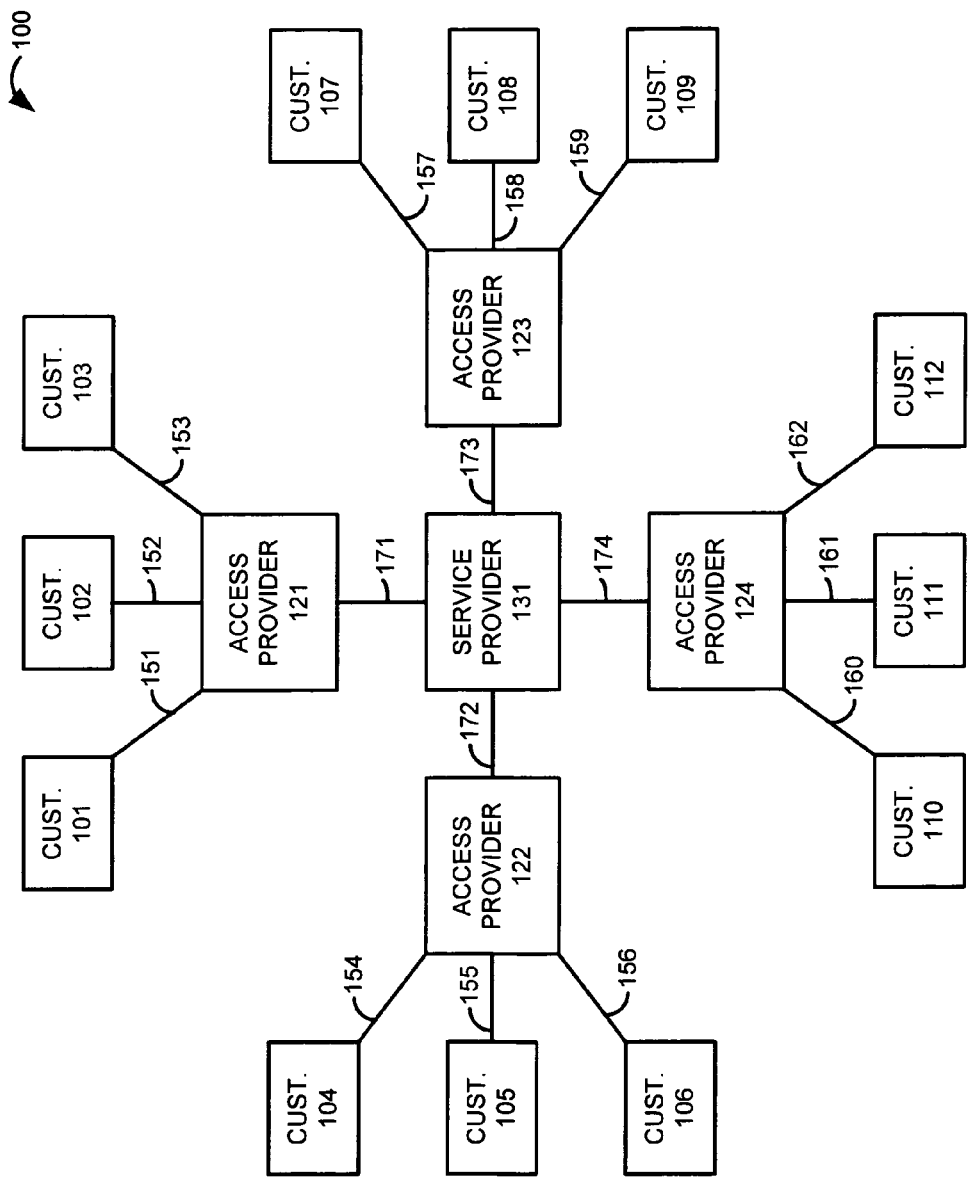
FIG. 1 illustrates communication system 100 in an example of the invention.

FIG. 1 illustrates communication system 100 in an example of the invention. Communication system 100 includes customers 101-112, access providers 121-124, and service provider 131. Customers 101-103 are coupled to access provider 121 over packet connections 151-153. Customers 104-106 are coupled to access provider 122 over packet connections 154-156. Customers 107-109 are coupled to access provider 123 over packet connections 157-159. Customers 110-112 are coupled to access provider 124 over packet connections 160-162. Service provider 131 is coupled to access providers 121-124 over respective packet connections 171-174.

Service provider 131 provides communication services, such as telephony and Internet access, over the access provided by access providers 121-124. Note that service provider 131 is a separate entity from access providers 121-124. Also note that access providers 121-124 provide the access over packet connections 151-162 and 171-174. Thus, the problem discussed above in the prior art applies—how can service provider 131 test and control the access provided by separate access providers 121-124 without compromising security.

Figure 2:
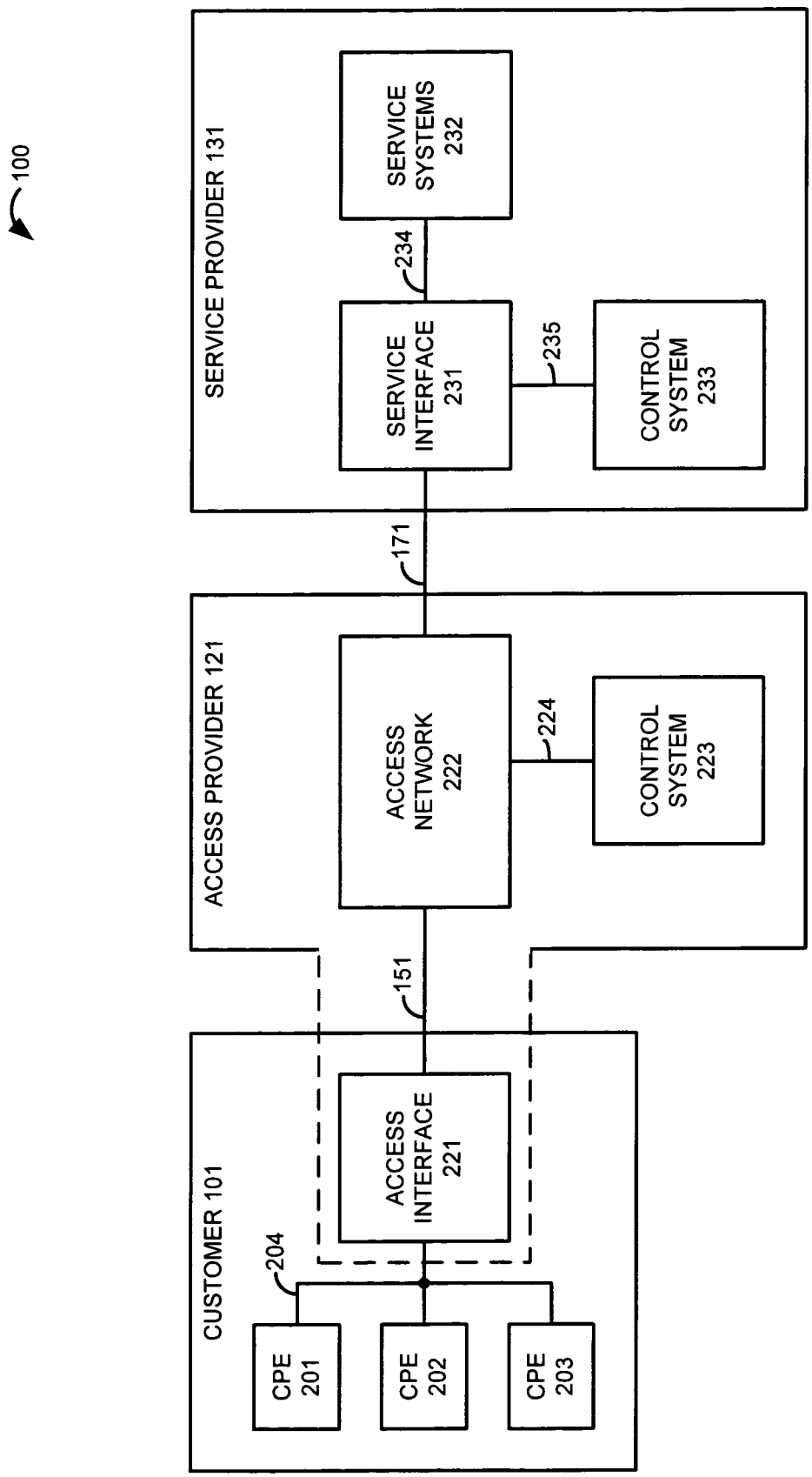
FIG. 2 illustrates communication system 100 in an example of the invention.

FIG. 2 illustrates communication system 100 in an example of the invention. In particular, FIG. 2 illustrates customer 101, access provider 121, and service provider 131. Other customers, access providers, and service providers could be configured in a similar fashion.

Customer 101 includes Customer Premise Equipment (CPE) 201-203 and customer network 204. Access provider 121 includes access interface 221, access network 222, and control system 223. Note that as indicated by the dashed line, access interface 221 is a part of access provider 121, but access interface 221 is located at the premise of customer 101. Service provider 131 includes service interface 231, service systems 232, and control system 233.

Access interface 221 is coupled to access network 222 over packet connection 151. Access network 222 is coupled to service interface 231 over packet connection 171. Access network 222 is coupled to control system 223 by packet connection 224. Service interface 231 is coupled to service systems 232 over packet connection 234. Service interface 231 is coupled to control system 233 over packet connection 235.

CPE 201-203 could be computers, telephones, video systems, storage systems, or some other equipment with communications capability. Customer network 204 could be a Local Area Network (LAN) or some other enterprise network. Access interface 221 could be a router, switch, termination device, or other device that provides customer network 101 with access to packet connection 151. Access network 222 could be an Ethernet network, and IP network, or some other type of packet network. Service interface 231 could be a router, switch, termination device, or other device that provides service systems 232 and control system 233 access to packet connection 171. Service systems 232 comprise the equipment that provides telephony, Internet, data, or other communications services. Control systems 223 and 233 could be computer systems or circuitry and they could be integrated and/or distributed within other systems.

Figure 3:
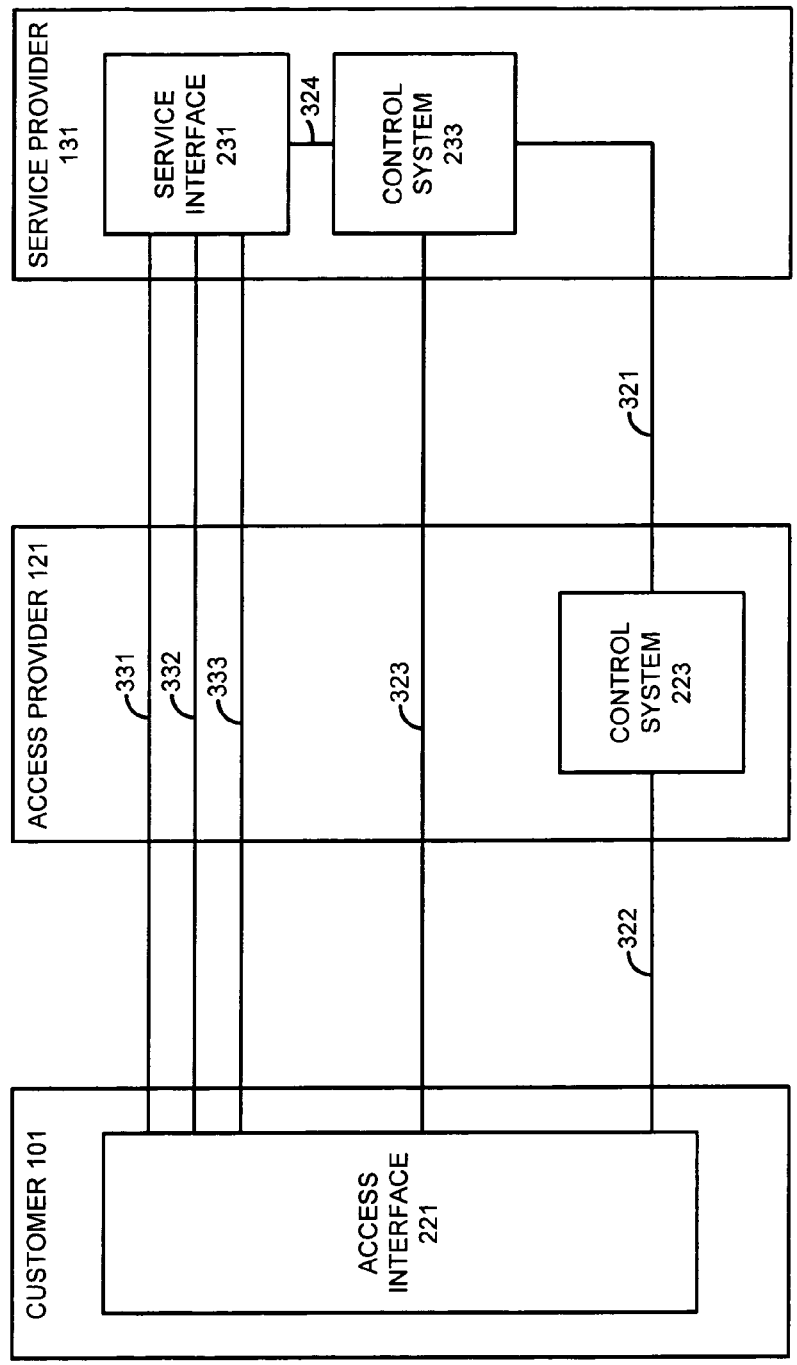
FIG. 3 illustrates communication system 100 in an example of the invention.

FIG. 3 illustrates communication system 100 in an example of the invention. In particular, FIG. 3 illustrates access interface 221 at customer 101, control system 223 at access provider 121, and service interface 231 and control system 233 at service provider 131. Control system 233 of service provider 131 is coupled to control system 223 of access provider 121 over control link 321. Control system 223 of access provider 121 is coupled to access interface 221 at customer 101 over control link 322. Control system 233 of service provider 131 is coupled to access interface 221 at customer 101 over control link 323. At service provider 131, control system 233 is coupled to service interface 231 over control link 324. Control links 321-324 could be provided through service interface 231 and access network 222 over packet connections 151, 171, 224, and 235, or they could use alternative communications transport. Control links 321-324 could be encrypted IP tunnels or some other type of secure packet links.

Access interface 221 at customer 101 is coupled to service interface 231 at service provider 131 over service links 331-333. At customer 101, service links 331-333 are coupled to CPE 201-203 through access interface 221 over customer network 204. At service provider 131, service links 331-333 are coupled to service systems 232 through service interface 231 over packet connection 234. Thus, CPE 201-203 at customer 101 interact with service systems 232 at service provider 131 over service links 331-333 to obtain services, such as telephony and Internet access. Access provider 121 provides service links 331-333 through access network 222 over packet connections 151 and 171. Service links 331-333 could be Ethernet Virtual LANs (VLANs), IP tunnels, or some other type of packet links.

Note that service provider 131 has a control port on access interface 221 to receive control link 323. Using control link 323, service provider 131 can test and control service links 331-333 through the control port on access interface 221. Advantageously, the testing and control is provided in a secure manner, so the security of customer 101, access provider 121, and service provider 131 is not compromised.

Figure 4:
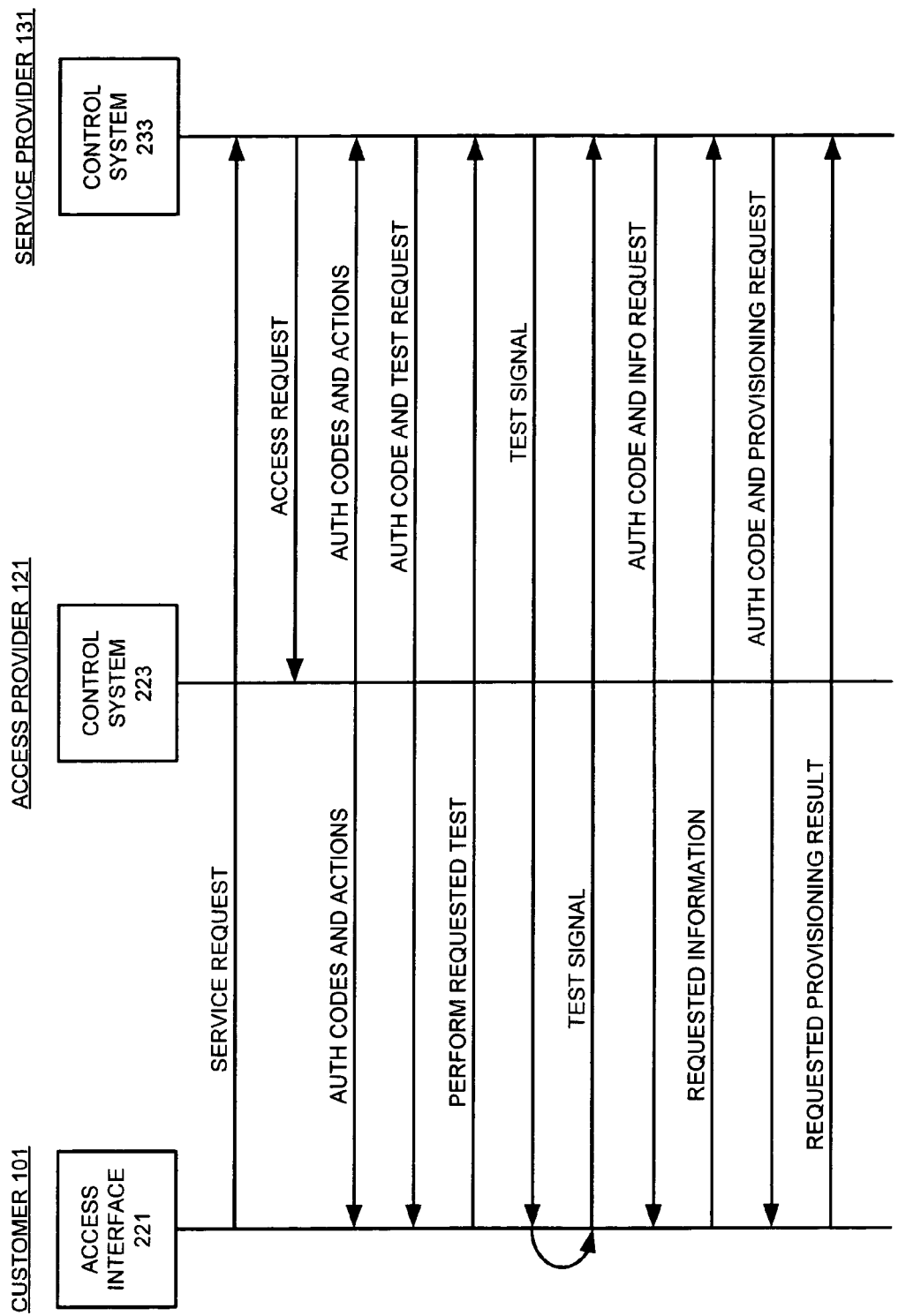
FIG. 4 illustrates communication system 100 operation in an example of the invention.

FIG. 4 illustrates communication system 100 operation in an example of the invention. Service provider control system 233 receives a service request from customer 101 through access interface 221, although the service request could be provided through another technique, such as a telephone, the Internet, or in-person. In response to the service request from customer 101, service provider control system 233 transfers an access request to access provider control system 223.

The access request identifies the customer, the type of service link, link endpoints, link bandwidth, and possibly other parameters. The access request also indicates the various control actions that service provider 131 desires to implement through access interface 221. The access request also includes information to allow access interface 221 to authenticate the request as being a legitimate access request from service provider 131. Control actions include tests, information retrieval, and provisioning. Tests could be loopback tests or some other form of test. Information retrieval could obtain numbers for received packets, transmitted packets, corrupted packets, and lost packets. Information retrieval could obtain bandwidth usage, latency, jitter, OM statistics, probe data, or some other performance information. Provisioning could include adjusting bandwidth on a link, turning a link on or off, setting-up a new link, or some other provisioning task.

Although not shown for clarity, control system 223 issues access instructions to access network 222 to provide the requested access in response to the access request. Providing the access could entail installing new access interfaces and/or packet connections, or it could simply entail provisioning existing access interfaces and packet connections. For example, an access request for a new service link could result in the provisioning of service link 333 from access interface 221 to service interface 231 through existing access network 222 and over existing packet links 151 and 171.

In response to the access request, access provider control system 223 generates authentication codes that correspond to the requested control actions. The authentication codes allow service provider control interface 233 to control access interface 221 over control link 323. The authentication codes could use secure shell ports, public/private key pairs, secure socket layers, or some other type of technology for access interface 221 to authenticate service provider control system 233 in a secure manner.

Access provider control system 223 transfers the authentication codes and corresponding control actions for service provider 131 to service provider control system 233. Access provider control system 223 also transfers the authentication codes and corresponding control actions for service provider 131 to access interface 221. Access interface 221 at customer 101 stores the authentication codes and corresponding actions for service provider 131 that were received from access provider control system 223. Access interface 221 at customer 101 uses the stored authentication codes and corresponding actions for service provider 131 to authenticate and authorize subsequent action requests from service provider control system 233.

Service provider 131 distributes the authentication codes and corresponding actions to service provider personnel who are authorized to initiate the corresponding actions. Different service personnel may receive different authentication codes based on the different roles that the service personnel have at service provider 131.

In response to an input by the service provider personnel authorized to initiate the corresponding action, service provider control system 233 transfers an action request and corresponding authentication code to access interface 221 at customer 101. Access interface 221 checks the action request authentication code against the previously stored authentication codes for service provider 131 that were received from access provider control system 223. If the authentication code is legitimate, access interface 221 checks the requested action in the action request against the previously stored authorized actions for the authentication code that were received from access provider control system 223. If the action is authorized for that authentication code, then access interface 221 performs the requested action. Access interface 221 then transfers an action result to service provider control system 233 indicating the result of the action request.

On FIG. 4, the first requested action is a loopback test, so service provider control system 233 transfers a Loopback Test action request for service link 333 and the corresponding authentication code to access interface 221. Access interface 221 checks the authentication code against the ones received from control system 223 for service provider 131. If the authentication code is legitimate, access interface 221 checks the requested Loopback Test against the actions that are authorized for that authentication code. If the Loopback Test is authorized for that authentication code, then access interface 221 transfers a Perform Loopback Test message to control system 233. In response to the Perform Loopback Test message, control system 233 transfers a loopback test signal over service link 333 (through control link 324). Access interface 221 receives the loopback test signal and loops the test signal back to control system 233 over service link 333. Control system 233 processes the received loopback test signal to assess latency, signal quality, and other performance metrics for service link 333.

The second requested action is information retrieval for service link 333. Service provider control system 233 transfers a Packet Loss information retrieval action request for service link 333 and the corresponding authentication code to access interface 221. Access interface 221 checks the authentication code against the ones received from control system 223 for service provider 131. If the authentication code is legitimate, access interface 221 checks the Packet Loss information retrieval against the actions that are authorized for that authentication code. If the Packet Loss information retrieval is authorized for that authentication code, then access interface 221 obtains the requested packet loss information and transfers the requested packet loss information to service provider control system 233.

The third requested action is provisioning for service link 333. Service provider control system 233 transfers a Link Off provisioning action request for service link 333 and the corresponding authentication code to access interface 221. Access interface 221 checks the authentication code against the ones received from control system 223 for service provider 131. If the authentication code is legitimate, access interface 221 checks the Link Off provisioning against the actions that are authorized for that authentication code. If the Link Off provisioning is authorized for that authentication code, then access interface 221 turns off service link 333 and transfers a Link Off message for service link 333 to service provider control system 233.

For added security, access provider control system 223 can cause authentication codes to automatically and periodically expire. Access provider control system 233 can also automatically generate and transfer new authentication codes with their corresponding authorized actions to service provider control system 233 and access interface 221 for subsequent use as described above.

Service provider 131 can manage who is able to exert what type of control through access interface 221 by obtaining multiple authentication codes with various corresponding authorized actions. Some actions are rather passive, such as information retrieval, and the authentication code for these passive actions could be more broadly distributed without harming security. Other actions, such as bandwidth adjustments and link off provisioning, could have serious negative effects if mis-used, so the authentication codes for these more serious actions could be more tightly controlled to protect security. Thus, service provider 131 can distribute authentication codes to their service personnel based on the role that the service personnel have at service provider 131.

For example, a first authentication code could be authorized to turn service links on and off and to adjust bandwidth. Due to the serious nature of service link on/off and bandwidth adjustment, the first authentication code may only be provided to a few high-level individuals who can be trusted to use the action properly. A second authentication code could authorize testing, and may be provided only to the operations personnel who need to perform troubleshooting. A third authentication code could authorize only information retrieval, and it could be more broadly distributed to lower-level personnel responsible for generating reports and tracking status. Typically, access provider 121 would provide service provider 131 with a series of authentication codes with corresponding authorized actions for each customer to implement the role-based control on a per customer basis.

Figure 5:
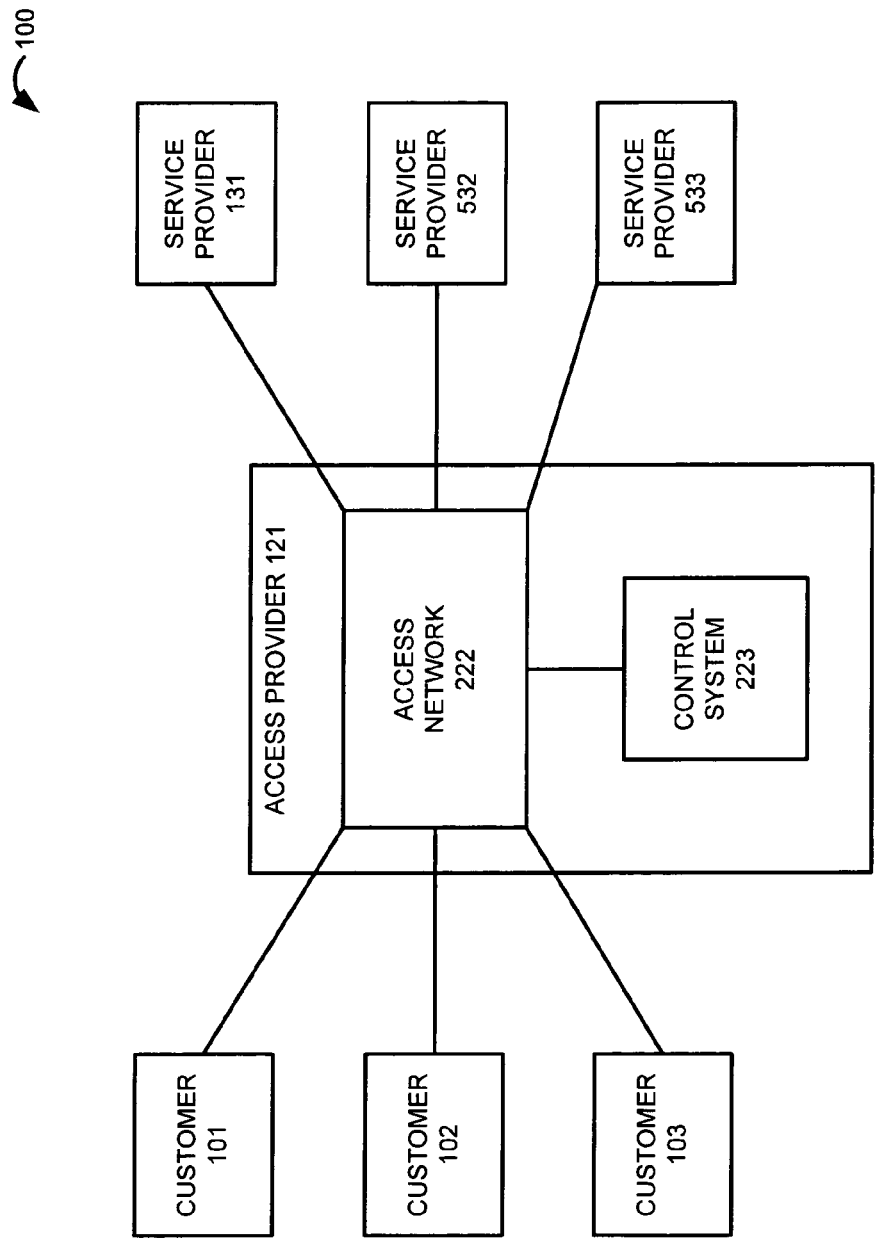
FIG. 5 illustrates communication system 100 in an example of the invention.

FIG. 5 illustrates communication system 100 in an example of the invention. As on FIG. 1, communication system 100 includes customers 101-103, access provider 121, and service provider 131. As on FIG. 2, access provider 121 includes access network 222 and control system 223. Communication system 100 also includes service providers 532-533. Although not shown for clarity, service providers 532-533 also have control systems that are configured and operate like service provider control system 233. Access provider control system 223 interacts with these control systems of service providers 532 and 533 as indicated above. The control interfaces of service providers 532 and 533 also interact with the access interfaces at customers 101-103 as indicated above.

In addition, customers 101-103 could be equipped with their own control interfaces that are configured and operate like service provider control interface 233. Thus, customers 101-103 could run tests, retrieve information, and perform provisioning of their service links that are provided by access provider 221 as described above for service provider 131.

Alternatively, customers 101-103 could have their own control systems that provide an interface to service provider control system 233. The customer control system would request actions from service provider control system 233 in a secure manner as indicated above, and service provider control system 233 to implement the requested actions as indicated above. Thus, actions such as testing, information retrieval, and provisioning could be extended to the customer control systems through service provider control system 233.

From FIGS. 1-5 and the above discussion, it should be appreciated that customers, service providers, and access providers can interact in an automated fashion to perform tests, retrieve information, and control provisioning of the service links through the access interfaces at the customer premise. Advantageously, the control interface described above can be fully automated for speed and efficiency. Advantageously, the use of authentication codes and authorized actions provides security to the customers, access providers, and service providers.

Figure 6:
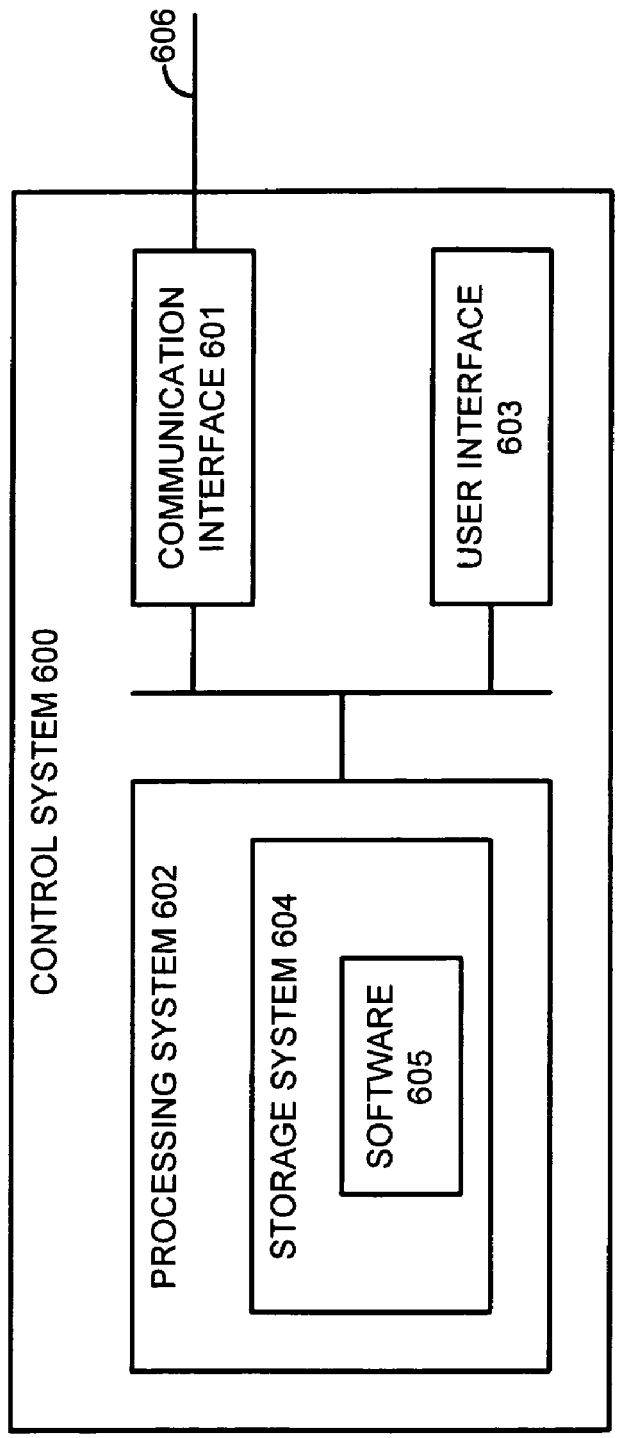
FIG. 6 illustrates control system 600 in an example of the invention.

FIG. 6 illustrates control system 600 in an example of the invention. Control system 600 represents control system 223 or 233. Control system 600 includes communication interface 601, processing system 602, and user interface 603. Processing system 602 includes storage system 604. Storage system 604 stores software 605. Processing system 602 is linked to communication interface 601 and user interface 603. Control system 600 could be comprised of a programmed general-purpose computer, although those skilled in the art will appreciate that programmable or special purpose circuitry and equipment may be used. Control system 600 may use a client server architecture where operations are distributed among a server system and client devices that together comprise elements 601-605.

Communication interface 601 exchanges messages over control links 606. Communication interface 601 could comprise an Ethernet interface card, IP port, or some other communication device. Communication interface 601 may be distributed among multiple communication devices. Processing system 602 could comprise a computer microprocessor, logic circuit, or some other processing device. Processing system 602 may be distributed among multiple processing devices. User interface 603 could comprise a keyboard, mouse, voice recognition interface, microphone and speakers, graphical display, touch screen, or some other type of user device. Storage system 604 could comprise a disk, tape, integrated circuit, server, or some other memory device. Storage system 604 may be distributed among multiple memory devices.

Processing system 602 retrieves and executes software 605 from storage system 604. Software 605 may comprise an operating system, utilities, drivers, networking software, and other software typically loaded onto a general-purpose computer. Software 605 could comprise an application program, firmware, or some other form of machine-readable processing instructions. When executed by processing system 602, software 605 directs processing system 602 to operate as described above for control systems 223 or 233.

The invention claimed is:

1. A method of operating a communication service provider, wherein a customer requests a communication service from the communication service provider, the method of operating the communication service provider comprising:
   in a control system, transferring an access request to an access provider that is separate from the communication service provider and that provides an access interface at a customer premise of the customer and provides a packet service link and a packet control link from the access interface to the communication service provider;
   in the control system, receiving an authentication code and a corresponding authorized action from the access provider in response to the access request;
   distributing the authentication code to service provider personnel authorized to initiate the corresponding authorized action;

receiving an input from the service provider personnel authorized to initiate the corresponding authorized action;

in response to the input from the service provider personnel authorized to initiate the corresponding authorized action, transferring an action request from the control system over the packet control link to the access interface at the customer premise wherein the action request indicates the authentication code and the corresponding authorized action for the packet service link, wherein the access interface authenticates the corresponding authorized action for the packet service link based on the authentication code and the corresponding authorized action, and performs the corresponding authorized action upon successful authentication;

in the control system, receiving an action result from the access interface indicating a result of the action request; and in a service system, providing the communication service over the packet service link.

2. The method of claim 1 wherein the corresponding authorized action comprises a test.

3. The method of claim 1 wherein the corresponding authorized action comprises a loopback test and further comprising transferring a test signal from the communication service provider over the packet service link to the access interface in response to the action result and processing the test signal looped back by the access interface to determine performance of the packet service link.

4. The method of claim 1 wherein the corresponding authorized action comprises an information request and wherein the action result indicates the requested information.

5. The method of claim 4 wherein the requested information comprises at least one of: packets received, packets transferred, packets lost, and packet latency for the packet service link.

6. The method of claim 1 wherein the corresponding authorized action comprises a provisioning task.

7. The method of claim 6 wherein the provisioning task comprises adjusting bandwidth on the packet service link.

8. The method of claim 6 wherein the provisioning task comprises turning off the packet service link.

9. The method of claim 6 wherein the provisioning task comprises adding an additional packet service link from the access interface to the service provider.

10. The method of claim 1 wherein the authentication code automatically expires and further comprising receiving a new authentication code from the access provider to replace the expired authentication code, and distributing the new authentication code to the service provider personnel authorized to initiate the corresponding authorized action.

11. A communication service provider, wherein a customer requests a communication service from the communication service provider, the communication service provider comprising:

a control system configured to transfer an access request to an access provider that is separate from the communication service provider and that provides an access interface at a customer premise of the customer and provides a packet service link and a packet control link from the access interface to the communication service provider;

the control system further configured to receive an authentication code and a corresponding authorized action from the access provider in response to the access request wherein the authentication code is distributed to service provider personnel authorized to initiate the corresponding authorized action;

the control system further configured to receive an input from the service provider personnel authorized to initiate the corresponding authorized action;

the control system further configured, in response to the input from the service provider personnel authorized to initiate the corresponding authorized action, to transfer an action request over the packet control link to the access interface at the customer premise wherein the action request indicates the authentication code and the corresponding authorized action for the packet service link, wherein the access interface authenticates the corresponding authorized action for the packet service link based on the authentication code and the corresponding authorized action, and performs the corresponding authorized action upon successful authentication;

the control system further configured to receive an action result from the access interface indicating a result of the action request; and a service system configured to provide the communication service over the packet service link.

12. The communication service provider of claim 11 wherein the corresponding authorized action comprises a test.

13. The communication service provider of claim 11 wherein the corresponding authorized action comprises a loopback test and the communication service provider is configured to transfer a test signal over the packet service link to the access interface in response to the action result and process the test signal looped back by the access interface to determine performance of the packet service link.

14. The communication service provider of claim 11 wherein the corresponding authorized action comprises an information request and wherein the action result indicates the requested information.

15. The communication service provider of claim 14 wherein the requested information comprises at least one of: packets received, packets transferred, packets lost, and packet latency for the packet service link.

16. The communication service provider of claim 11 wherein the corresponding authorized action comprises a provisioning task.

17. The communication service provider of claim 16 wherein the provisioning task comprises adjusting bandwidth on the packet service link.

18. The communication service provider of claim 16 wherein the provisioning task comprises turning off the packet service link.

19. The communication service provider of claim 16 wherein the provisioning task comprises adding an additional packet service link from the access interface to the communication service provider.

20. The communication service provider of claim 11 wherein the authentication code automatically expires and the control system is configured to receive a new authentication code from the access provider to replace the expired authentication code, wherein the new authentication code is distributed to the service provider personnel authorized to initiate the corresponding authorized action.

\* \* \* \* \*